United States Patent [19]

Slocum

[11] Patent Number: 5,074,389
[45] Date of Patent: Dec. 24, 1991

[54] PERIPHERALLY VALVED, TEMPERATURE-COMPENSATED SHOCK ABSORBER

[75] Inventor: Robert G. Slocum, Mesa, Ariz.

[73] Assignee: Bobcat Engineering Corporation, Mesa, Ariz.

[21] Appl. No.: 470,863

[22] Filed: Jan. 25, 1990

[51] Int. Cl.⁵ .............................. F16F 9/52; F16F 9/00
[52] U.S. Cl. ................................ 188/277; 188/322.19; 188/322.22
[58] Field of Search ............... 188/268, 276, 277, 316, 188/322.19, 322.5, 269, 322.15, 322.22; 267/64.13; 236/93 R

[56] References Cited

U.S. PATENT DOCUMENTS

| | | | |
|---|---|---|---|
| 2,856,035 | 10/1958 | Rohacs | 188/269 |
| 3,056,473 | 10/1962 | Zeidler | 188/276 |
| 3,168,301 | 2/1965 | Allinquant | 188/316 X |
| 3,957,259 | 5/1976 | Peddinghaus | 188/269 X |
| 4,048,905 | 9/1977 | Souslin | 188/284 X |
| 4,344,637 | 8/1982 | Williams, Jr. et al. | 188/269 X |
| 4,369,864 | 1/1983 | de Carbon | 188/277 |
| 4,570,912 | 2/1986 | Dodson et al. | 188/284 X |

FOREIGN PATENT DOCUMENTS 1115057  4/1956  France ............................ 188/276

Primary Examiner—Robert J. Oberleitner
Attorney, Agent, or Firm—David G. Rosenbaum

[57] ABSTRACT

A shock absorber of the type having a hydraulic cylinder and piston is disclosed. The hydraulic cylinder is filled with an elevated viscosity fluid having slight compressibility which exhibits pseudo-plastic flow. The piston has an associated thermal expansion means associated therewith, which defines an annular space between the peripheral surface of the thermal expansion means and the cylinder wall. The annular space acts as a peripheral valve to impart resistance to piston travel through the fluid. The thermal expansion means is selected to have a coefficient of thermal expansion greater than that of the cylinder, whereby extremes of ambient or internally generated temperatures cause the thermal expansion means to adjust the peripheral valving, thus compensating for temperature-induced fluid viscosity changes to produce consistent dampening.

17 Claims, 2 Drawing Sheets

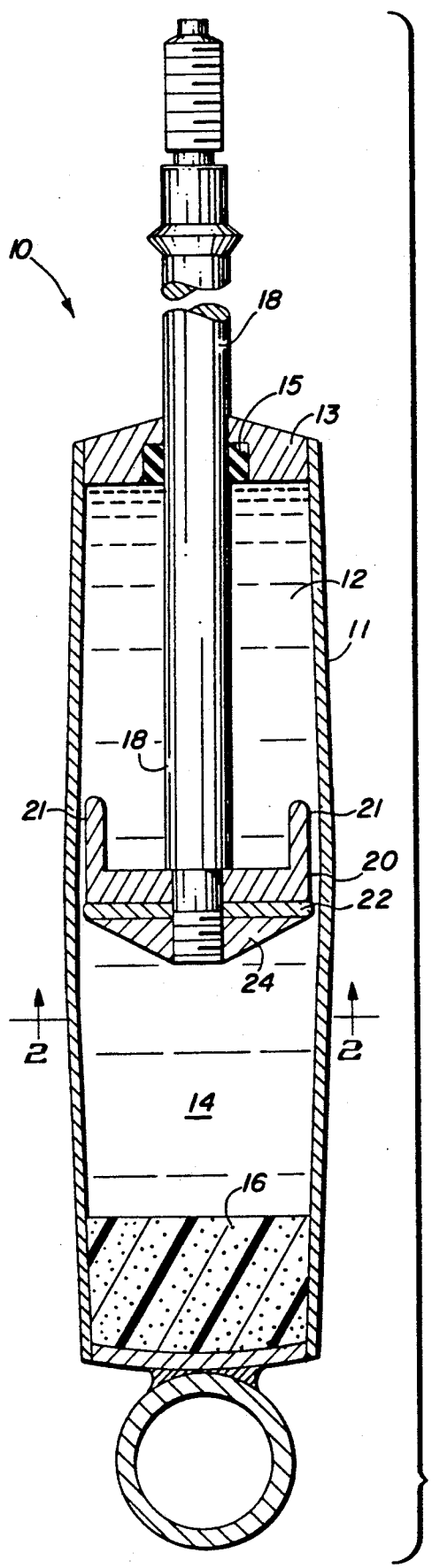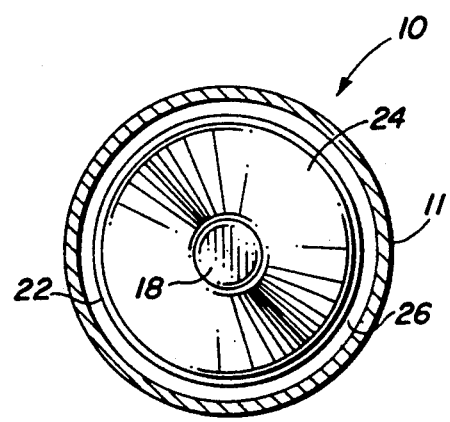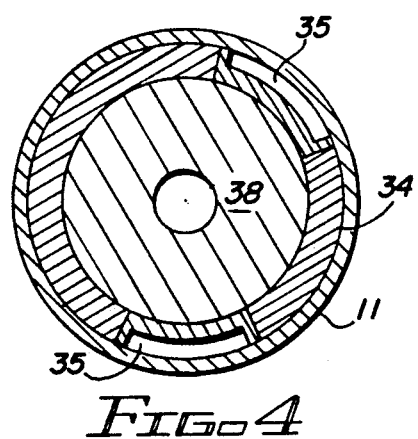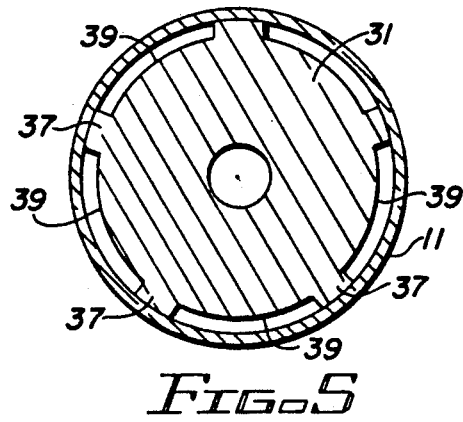
FIG.-1
FIG.-2
FIG.-4
FIG.-5

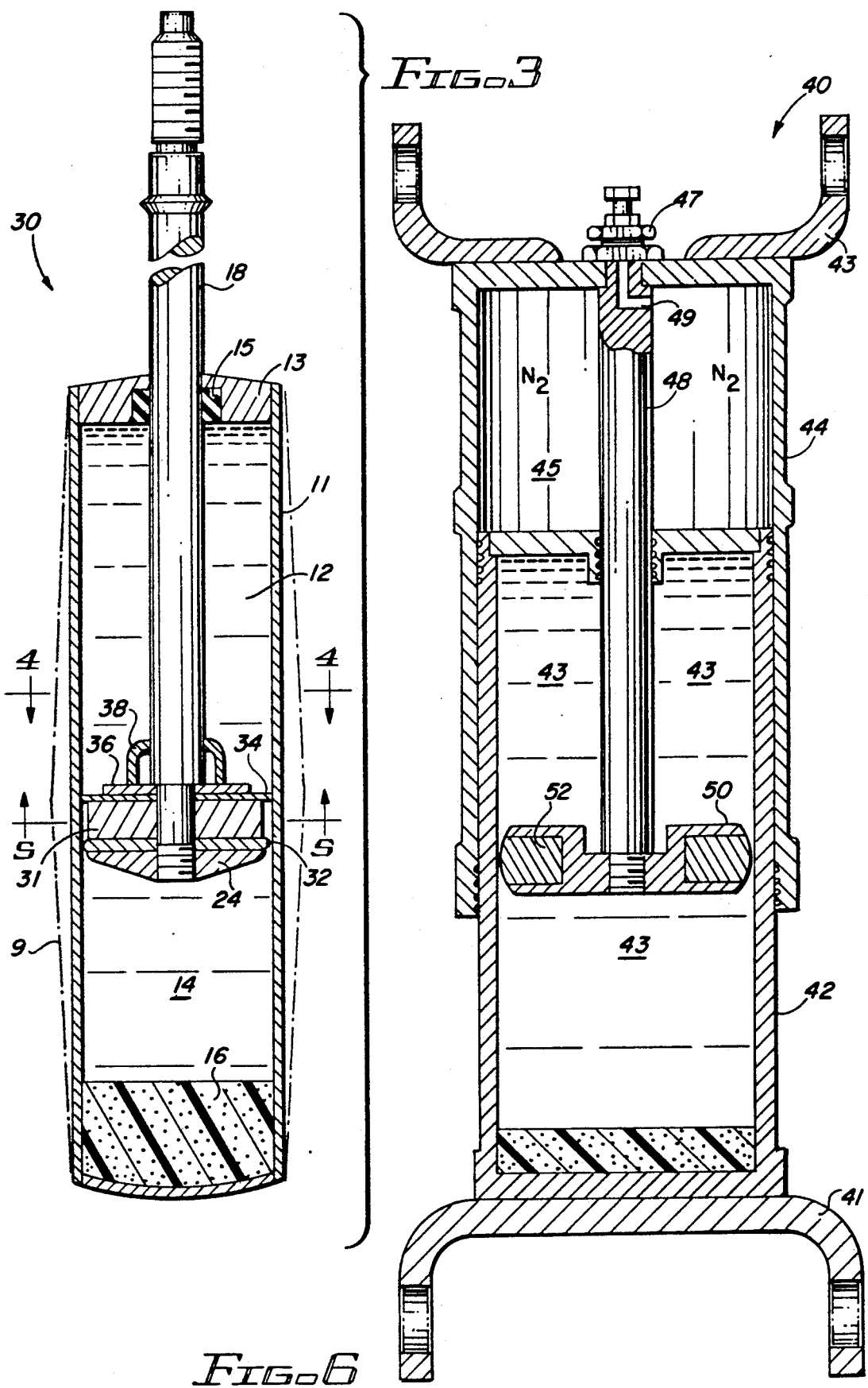

PERIPHERALLY VALVED, TEMPERATURE-COMPENSATED SHOCK ABSORBER

BACKGROUND OF THE INVENTION

The present invention relates generally to hydraulic shock absorber apparatus of the type employing a fluid filled cylinder and piston arrangement. More particularly, the present invention relates to hydraulic shock absorber apparatus wherein resistance to piston travel is regulated by valves associated within the piston and/or fluid passage between a cylinder and an annular reservoir, and/or a tapered bore within the cylinder to facilitate variable resistance loading relative to the piston position.

Conventional piston-type hydraulic shock absorbers and dampers normally include a piston head attached to an input shaft, whereby input forces are axially applied to the shaft and initiate reciprocal movement of the piston head. Reciprocation of the piston head displaces a quantity of hydraulic fluid through a metering port or valve, whereupon the input energy is dissipated by displacing the fluid through the port. The velocity of the reciprocating head, and therefore the quantity of energy dissipated, is controlled by metering the flow of the displaced fluid to a desired rate.

Many arrangements for achieving a valve orifice variable with piston position have been developed. Most of the hydraulic shock absorbers employ piston arrangements which force a low viscosity, petroleum-based, hydraulic fluid through small openings or valves under very high pressure. Such devices may include a circular orifice in the piston through which passes a tapered rod attached to the cylinder, varied depth grooves in the side wall of the cylinder, tapered cylinders in which a fixed diameter piston operates, spring-loaded valves associated with orifices in the piston or tapered cylinders with compressible piston rings. For example, U.S. Pat. No. 4,048,905 issued Sept. 20, 1977, entitled "Variable Orifice Hydraulic Snubber" discloses a piston cylinder hydraulic snubbing device which employs the gap between ends of a piston ring as the valve orifice. The valve orifice, or piston ring gap, is varied by engagement of the ring with a tapered bore in the cylinder. Thus, on a jounce stroke, the piston ring is compressed against the tapered sidewall of the cylinder and closes the ring gap, thereby increasing piston stroke resistance. On the rebound stroke, the piston ring expands against the tapered sidewall of the cylinder, thereby opening the ring gap and reducing hydraulic resistance to the rebound stroke.

A common problem with many hydraulic shock absorbers involves heat, foaming and cavitation of the hydraulic fluid. A commonly employed solution is to pressurize the hydraulic chamber with nitrogen to control vapor pressures and reduce foaming and fade to improve performance. More recent attempts to improve shock absorber performance has led to electronic or computer controlled valving to provide acceptable performance over a wider range of conditions. By employing extrinsic controls, the reliability and cost of the shock absorber become significant factors in the selection of a suspension system.

Accordingly, a substantial need has been recognized to provide a shock absorber apparatus which, under most circumstances eliminates the need for gas pressurization of the hydraulic cylinder as well as for extrinsic controls over the suspension. In its place, the present invention offers a hydraulic shock absorber which employs an elevated viscosity fluid as the dampening medium and a unique piston construction which utilizes peripheral valving to shunt the fluid between the peripheral edge of the piston and the cylinder wall.

SUMMARY OF THE INVENTION

In accordance with a broad aspect of the present invention there is provided a shock absorber of the type having a hydraulic cylinder and piston. The hydraulic cylinder is filled with a slightly compressible fluid of elevated viscosity which exhibits pseudo-plastic flow under extreme shear and can be blended into viscosities from about 10 to about 600,000 centistokes with a viscosity-temperature coefficient below about 0.6. Polydimethylsiloxane silicone fluid exhibits these properties. A non-absorbent, compressible medium such as closed cell sponge neoprene is provided within the hydraulic cylinder at either or both ends of the cylinder. This medium is compressed by the fluid displaced by the piston rod as it travels into the cylinder. Resistance to this compression serves to pressurize the fluid chamber, thus limiting the formation of air bubbles. In accordance with alternative embodiments of the present invention, the hydraulic cylinder may have a straight or tapered bore, depending upon the vehicular application.

The piston of the present invention is of solid construction without primary orifices or valve openings in the piston head. Rather, in accordance with the invention, a thermal expansion means is associated with the piston head. An annular space exists between the periphery of the thermal expansion means and the cylinder wall. It is this annular space which acts as the peripheral valve for travel of the fluid around the piston head. Under increasing ambient or internally generated temperatures, the thermal expansion means heats, expands into closer engagement with the cylinder wall, thereby narrowing the annular space between the expansion means and the cylinder wall. Low ambient temperatures would cause this annular spacing to increase. Thus, the valve resistance remains constant, regardless of fluid viscosity changes due to ambient or internally generated temperatures. Dampening performance is maintained, even under conditions of extreme cold or heat. Internally generated heat is created at that area of the shock absorber where ambient cooling is most available.

The thermal expansion means may be made from various materials, each having different coefficients of thermal expansion. It may be embodied as any part of the piston, or the entire piston. In this manner, depending upon the vehicular use, virtually infinite variations on valve resistance are possible. Additionally, a wide variety of fluid viscosities may be employed to tailor the shock absorber performance to the particular vehicular use.

In accordance with another aspect of the invention, there is provided a shock absorber adapted for uses in which side loadings or bending forces are encountered, e.g., MacPherson struts. Under these conditions, a load-bearing element having a plurality of peripheral ports alternated with load-bearing segments is employed in association with the piston head. This embodiment of the invention also employs a thermal expansion means.

Finally, in accordance with a more specific aspect of the present invention, the shock absorber of the present invention is adapted for aviation or other applications commonly known as oleo struts. In accordance with this embodiment, a gas pressurization cylinder is concentrically disposed about the rebound end of the hydraulic cylinder, which is reciprocally engaged therein.

These and other features and advantages of the present invention will become more apparent from the following more detailed description of the preferred embodiments of the invention, taken with reference to the accompanying figures, in which like features are identified by like reference numerals.

BRIEF DESCRIPTION OF THE FIGURES

FIG. 1 is a cross-sectional side elevational view of a shock absorber in accordance with the present invention.

FIG. 2 is a cross-sectional view taken along line 2—2 of FIG. 1.

FIG. 3 is a cross-sectional side elevational view of an alternative embodiment of the shock absorber of the present invention.

FIG. 4 a cross-sectional view taken along line 4—4 of FIG. 3.

FIG. 5 is a cross-sectional view taken along line 5—5 of FIG. 3.

FIG. 6 is a side elevational cross-sectional view of another embodiment of the shock absorber in accordance with the present invention.

In each of the foregoing figures, piston clearances and bore tapers are shown exaggerated for clarity.

DETAILED DESCRIPTION OF THE PREFERRED EMBODIMENTS

Turning now to FIG. 1 in the accompanying figures, there is shown a shock absorber 10 in accordance with a first preferred embodiment of the invention. Shock absorber 10 is of a cylinder and piston arrangement, wherein a cylinder 11, having either a straight or tapered bore 12, is provided. A piston rod 18 is disposed in said bore 12 in reciprocating fashion. Cylinder 11 is provided with an end cap 13 having a seal 15 of conventional design through which the piston rod 18 travels. A piston head 20 is reciprocally disposed in said bore 12 and coupled to an end of piston rod 18. In accordance with a preferred embodiment of the present invention, piston head 20 consists of a three part construction. A first part consists of a pyramidal- or cone-shaped head portion 24 which is provided on the jounce side of the piston head. A second portion of said piston head 20 consists of a U-shaped cylindrical member 21, forming a cup-like surface on the rebound side of said piston head 20. Interdisposed between said U-shaped member and said pyramidal-shaped piston head 24 is a thermal expansion means 22. Thermal expansion means 22 is selected from any class of materials, such as aluminum, plastic, or the like which has a coefficient of thermal expansion appropriate for use in the present invention.

Provided within bore 12 is a hydraulic fluid 14, preferably consisting of an elevated viscosity fluid having slight compressibility and which exhibits pseudo-plastic flow under extreme shear conditions. The fluid may be blended into viscosities in the range of about 10 to 600,000 centistokes and has a viscosity temperature coefficient below 0.6, such as polydimethylsiloxane silicone fluid.

Those skilled in the art will appreciate that in operation, the present invention provides resistance to piston head travel by peripheral valving of the fluid 14 through the annular space defined by the circumference of the thermal expansion means 22 and the bore 12. Additional resistance to rebound travel is provided by the hydrodynamic effect of the fluid on the cup-shaped member 21 on the rebound side of the piston head. A non-absorbent, compressible means 16, such as closed cell sponge neoprene, allows displacement of the piston rod 18 to pressurize the cylinder 11 and thereby collapse air bubbles which may become suspended in the fluid 14. The degree and level of pressurization will, of course, depend upon the resistance of the specific type of compressible medium employed, which would be selected according to the desired application of the shock absorber apparatus 10.

Turning now to the embodiment illustrated with reference to FIGS. 3-5, there is disclosed a shock absorber apparatus 30 adapted for use where side loadings and stresses occur, such as with MacPherson strut applications. The overall operation and selection of the fluid 14 to be used with shock absorber apparatus 30 is identical to that of the previously discussed shock absorber apparatus 10. Specifically, shock absorber apparatus 30 also consists of a hollow cylinder 11 and interior bore 12, which may be tapered 9, as illustrated in phantom in FIG. 3, or straight, which contains the fluid 14, a non-absorbent, compressible pad 16, such as closed cell neoprene foam, disposed on either or both ends of the bore 12 to allow the displacement of the piston rod to pressurize the hydraulic cylinder. As with the previously disclosed embodiment, shock absorber apparatus 30 also has a piston rod 18 which reciprocates in bore 12 and passes through an end cap 13 having an appropriate seal 15 through which the piston rod travels.

In order to accommodate side loadings, the piston head arrangement of shock absorber apparatus 30 is modified by providing a pyramidal- or cone-shaped head member 24 coaxially disposed on the terminal end of the piston rod 18. Immediately adjacent to and coaxial with the head 24, there is provided the thermal expansion means 32 which forms an annular space or peripheral valve between its outer peripheral edge and the bore 12. Adjacent to and coaxial with the thermal expansion means 32, there is provided a load-bearing member 31. Load-bearing element 31 is a generally circular disk, made of a material having a coefficient of thermal expansion corresponding to that of the hollow cylinder 11, which may be coated with a friction-reducing material such as porcelain or hard chrome. Load-bearing member 31, as illustrated with reference to FIG. 5, consists of a generally circular member having at least one of a plurality of recesses 39 in the outer peripheral edge thereof. Recesses 39 act as peripheral ports, allowing passage of the fluid around the peripheral edge of the thermal expansion means, imparting resistance to travel of the piston through the fluid 14. The selection of size, distribution and number of recesses 39 may be made as desired to trim or tailor the shock absorber apparatus 30 for the specific loading as desired. The remaining surface of load-bearing member 31, constituting protrusions 37 between adjacent recesses 39, contact the inner surface of cylinder 11 and support side loadings on the piston head.

Immediately adjacent to the load-bearing element on the rebound side of the piston head, there is provided a deformable baffle 34, consisting of a flexible material, such as rubber or neoprene, or any other suitable flexible material. Deformable baffle 34 may be provided with at least one of a plurality of valve recesses 35 about its peripheral edge. A deformable baffle plate 36 is provided adjacent to the deformable baffle 34, and is coaxial therewith. Deformable baffle plate 36 acts to limit deformation of the outer peripheral surfaces of deformable baffle 34 and trim the opening of valve recesses 35. Coaxial with the deformable baffle plate and adjacent thereto is a rebound stop 38, of conventional design. The deflection of deformable baffle 34 during the jounce stroke allows primary restrictive jounce valving to occur at the thermal expansion means. Additional rebound restriction occurs because deflection is prevented by the loadbearing member 31.

Those skilled in the art will understand that the foregoing configuration facilitates peripheral valving of the fluid 14 as the piston head travels through bore 12. The deformable baffle 34 further provides selective resistance levels to piston head rebound travel through variations in its diameter and configuration.

According to a final preferred embodiment of the present invention, there is disclosed another embodiment of the shock absorber apparatus 40 of the present invention. Shock absorber apparatus 40 is adapted for use in aircraft oleo strut applications wherein there is rapid and heavy loading of the shock absorber, and critical reliability requirements. In accordance with this preferred embodiment, FIG. 6 shows the present invention applied to an oleo strut of otherwise conventional design.

There is also provided a cylindrical housing 44 which is concentrically disposed around hollow cylinder 42, which reciprocates within the interior space 45 of the hollow sleeve 44. A mounting means 41, for coupling the apparatus 40 to an axle or other undercarriage apparatus, is coupled to the hollow cylinder 42 and is, therefore, generally positioned on the jounce side of the apparatus 40. Hollow sleeve 44 is coupled to a trunnion mount 43, or any other suitable bracket, attached to the rebound side of the apparatus 40. The interior space 45 of hollow sleeve 44 may be charged with a gas, such as nitrogen, to provide dampening of the entire hollow cylinder 42. The piston rod 48 is attached to an upper end of hollow sleeve 44, and preferably communicates with a gas valve 47. A gas port 49 conducts gas from the gas valve 47 through the piston rod 48 and into the inner space 45 of the hollow sleeve 44. This arrangement permits further gas dampening on the jounce stroke by compression of the gas contained within inner space 45.

Viscous dampening of the piston rod 48 movement is accomplished in a manner as heretofore described. The piston head 50, having an associated thermal expansion means 52, provides for peripheral valving around the outer peripheral edge of the thermal expansion means 52 which is variable with temperature.

Those skilled in the art will appreciate and understand that the shock absorber apparatus for aircraft or oleo strut applications as described in this embodiment, presents structural improvements, progressive compression and rebound valving, and eliminates fluid contamination and leakage. There are no piston seals or other wear parts crucial to compression dampening.

While the invention has been described with reference to certain preferred embodiments, those skilled in the art will recognize that modifications and variations may be made in construction and material without departing from the spirit and scope of the present invention, which is intended to be limited only by the scope of the claims appended hereto.

I claim:
1. A shock absorber apparatus, comprising:
a cylinder having a closed end and a longitudinal bore;
a hydraulic fluid provided within said longitudinal bore;
a piston moveable in said longitudinal bore, said piston further comprising a piston head, said piston head having a thermal expansion member and a baffle member associated therewith, said baffle member being deformable in response to movement of said hydraulic fluid imparted by movement of the piston within the longitudinal bore; wherein an annular space is defined by an outer peripheral edge of said thermal expansion member, said baffle member and an inner surface of said cylinder, said annular space and said baffle member forming a peripheral valve through which said hydraulic fluid passes upon displacement of said piston wherein said deformable baffle arrows said annular space during a rebound stroke; and
a substantially non-absorbent compressible member disposed within said longitudinal bore at said closed end.

2. The shock absorber apparatus according to claim 1, wherein said longitudinal bore is tapered.

3. The shock absorber apparatus in accordance with claim 1, wherein said piston head further comprises a generally conical-shaped member and a generally cup-shaped member, wherein said thermal expansion member is interdisposed therebetween.

4. The shock absorber apparatus in accordance with claim 3, wherein said generally conical-shaped member and said generally cup-shaped member are selected of a material having a coefficient of thermal expansion less than or equal to that of said expansion member.

5. The shock absorber apparatus in accordance with claim 1, wherein said piston head further comprises said thermal expansion member.

6. The shock absorber apparatus in accordance with claim 1, wherein said piston head further comprises at least one side-load bearing member having at least one of a plurality of recesses in an outer peripheral edge thereof, said thermal expansion member being interdisposed between said at least one side-load bearing member and said deformable baffle member, said baffle member further having a support member coaxially aligned therewith to secure said deformable baffle and permit deformation only of an outer peripheral surface thereof.

7. The shock absorber apparatus in accordance with claim 6, wherein said conical-shaped member, said load-bearing element, and said cylinder are selected of materials having substantially equal coefficients of thermal expansion.

8. The shock absorber apparatus in accordance with claim 7, wherein said thermal expansion member is selected to have a coefficient of thermal expansion greater than said conical-shaped leading member, said load-bearing element, or said cylinder.

9. The shock absorber apparatus in accordance with claim 1, wherein said apparatus further comprises first mounting means connected to said closed end of said cylinder; a hollow sleeve member concentrically disposed about said cylinder and coaxial therewith, said cylinder being reciprocally disposed in said hollow sleeve member; second mounting means connected to said hollow sleeve member; wherein said piston is connected to said hollow sleeve member in coaxial alignment therewith.

10. The shock absorber apparatus in accordance with claim 1, wherein said thermal expansion member is selected to have a coefficient of thermal expansion greater than that of said cylinder.

11. The shock absorber apparatus of claim 1, wherein said hydraulic fluid further comprises a silicone fluid.

12. A shock absorber apparatus, of the type having a cylinder and a piston, comprising:
   a cylinder having a closed end and a longitudinal bore therein;
   a hydraulic fluid provided within said longitudinal bore;
   a piston disposed in said longitudinal bore and reciprocally movable in said hydraulic fluid, said piston further having a piston head, said piston head having a thermal expansion member, a side-load bearing member and a deformable member associated therewith, said deformable member being deformable in response to movement of said piston through said hydraulic fluid said thermal expansion member having a coefficient of thermal expansion greater than that of said cylinder; and
   an annular space defining a peripheral valve between an outer peripheral surface of said thermal expansion member, said deformable member and said longitudinal bore, wherein said sideload bearing member and said deformable member project in close proximity to an inner wall of said cylinder.

13. The shock absorber apparatus according to claim 12, wherein said apparatus further comprises a non-absorbent compressible member disposed within said longitudinal bore, said non-absorbent compressible member serving to pressurize the cylinder through displacement of said piston rod.

14. The shock absorber apparatus according to claim 12, wherein said longitudinal bore is tapered.

15. The shock absorber apparatus in accordance with claim 12, wherein said piston head further comprises a generally conical-shaped member and a generally cup-shaped member, wherein said thermal expansion member is interdisposed therebetween.

16. The shock absorber apparatus in accordance with claim 12, wherein said apparatus further comprises first mounting means connected to said closed end of said cylinder;
   a hollow sleeve member concentrically disposed about said cylinder and coaxial therewith, said cylinder being reciprocally disposed in said hollow sleeve member;
   second mounting means connected to said hollow sleeve member;
   wherein said piston is connected to said hollow sleeve member in coaxial alignment therewith.

17. The shock absorber apparatus in accordance with claim 12, wherein said piston head further comprises a conical-shaped leading member, said side-load bearing member having at least one of a plurality of recesses in an outer peripheral edge thereof, said thermal expansion member being interdisposed between said leading member and said side-load bearing element, and said deformable member being disposed adjacent to said load-bearing member, said deformable baffle having a support member coaxially aligned therewith to secure said deformable baffle and permit deformation of an outer peripheral surface thereof.

* * * * *

UNITED STATES PATENT AND TRADEMARK OFFICE
CERTIFICATE OF CORRECTION

PATENT NO. : 5,074,389

DATED : December 24, 1991

INVENTOR(S) : Robert G. Slocum

It is certified that error appears in the above-identified patent and that said Letters Patent is hereby corrected as shown below:

Column 6, line 20, change "arrows" to --narrows--.

Signed and Sealed this

Fifteenth Day of June, 1993

Attest:

MICHAEL K. KIRK

Attesting Officer

Acting Commissioner of Patents and Trademarks